United States Patent [19]
Kronestedt

[11] Patent Number: 6,104,936
[45] Date of Patent: Aug. 15, 2000

[54] METHOD AND APPARATUS FOR OPTIMIZING ANTENNA TILT

[75] Inventor: Fredric Kronestedt, Stockholm, Sweden

[73] Assignee: Telefonaktiebolaget LM Ericsson, Stockholm, Sweden

[21] Appl. No.: 08/941,204

[22] Filed: Sep. 30, 1997

[51] Int. Cl.$^7$ ....................................... H04B 1/38
[52] U.S. Cl. .................... 455/562; 455/67.3; 455/226.2; 342/359; 343/757; 343/882
[58] Field of Search ................... 455/562, 424, 455/453, 25, 63, 561, 226.2, 67.1, 70, 67.3, 446, 447, 129; 343/760, 882, 703, 893, 765, 754, 761–763; 342/367, 165

[56] References Cited

U.S. PATENT DOCUMENTS

| | | |
|---|---|---|
| 4,249,181 | 2/1981 | Lee . |
| 5,093,923 | 3/1992 | Leslie . |
| 5,257,405 | 10/1993 | Reitberger . |
| 5,379,048 | 1/1995 | Kaufman . |
| 5,428,817 | 6/1995 | Yahagi ..................................... 455/446 |
| 5,440,318 | 8/1995 | Butland et al. . |
| 5,551,060 | 8/1996 | Fujii et al. . |
| 5,668,562 | 9/1997 | Cutrer et al. ............................. 343/703 |
| 5,873,048 | 2/1999 | Yun ......................................... 455/562 |
| 5,924,040 | 7/1999 | Trompower ............................. 455/562 |
| 5,953,325 | 9/1999 | Willars .................................... 370/342 |
| 5,966,670 | 10/1999 | Keskitalo et al. ...................... 455/434 |

FOREIGN PATENT DOCUMENTS 04320121 11/1992 Japan .
08047043 2/1996 Japan .

OTHER PUBLICATIONS

M.E. Maragoudakis, "Antenna Pattern Considerations in Optimizing Cellular RF Designs", 8081 Proceedings of the National Communications Forum, 45 (1991) Sep. 30/Oct. 2, Chicago, IL, pp. 624–630.

Wu, J. et al. "Antenna Downtilt Performance in Urban Environments", IEEE Milcom 1996 Conference Proceedings, vol. 3, No. 15, Oct. 21–24, 1996, McLean, VA, pp. 739–744.

*Primary Examiner*—Dwayne D. Bost
*Assistant Examiner*—Charles R Craver
*Attorney, Agent, or Firm*—Burns, Doane, Swecker & Mathis, L.L.P.

[57] ABSTRACT

In a cellular telecommunications network, uplink interference, as measured by a base station in a target cell, and co-channel interference, as measured by mobile units in a co-channel cell are reduced by increasing the base station antenna tilt angle. However, increasing the base station antenna tilt angle reduces the effective coverage area of the target cell. To obtain an optimum base station antenna tilt angle, interference reduction and target cell coverage area reduction are quantified for each of a number of candidate base station antenna tilt angles. An interference reduction-to-target cell coverage area reduction ratio can then be established for each of the candidate base station antenna tilt angles. The optimum base station antenna tilt angle can then be identified as the one candidate base station antenna tilt angle that reflects the maximum interference reduction-to-target cell coverage area reduction ratio.

23 Claims, 5 Drawing Sheets

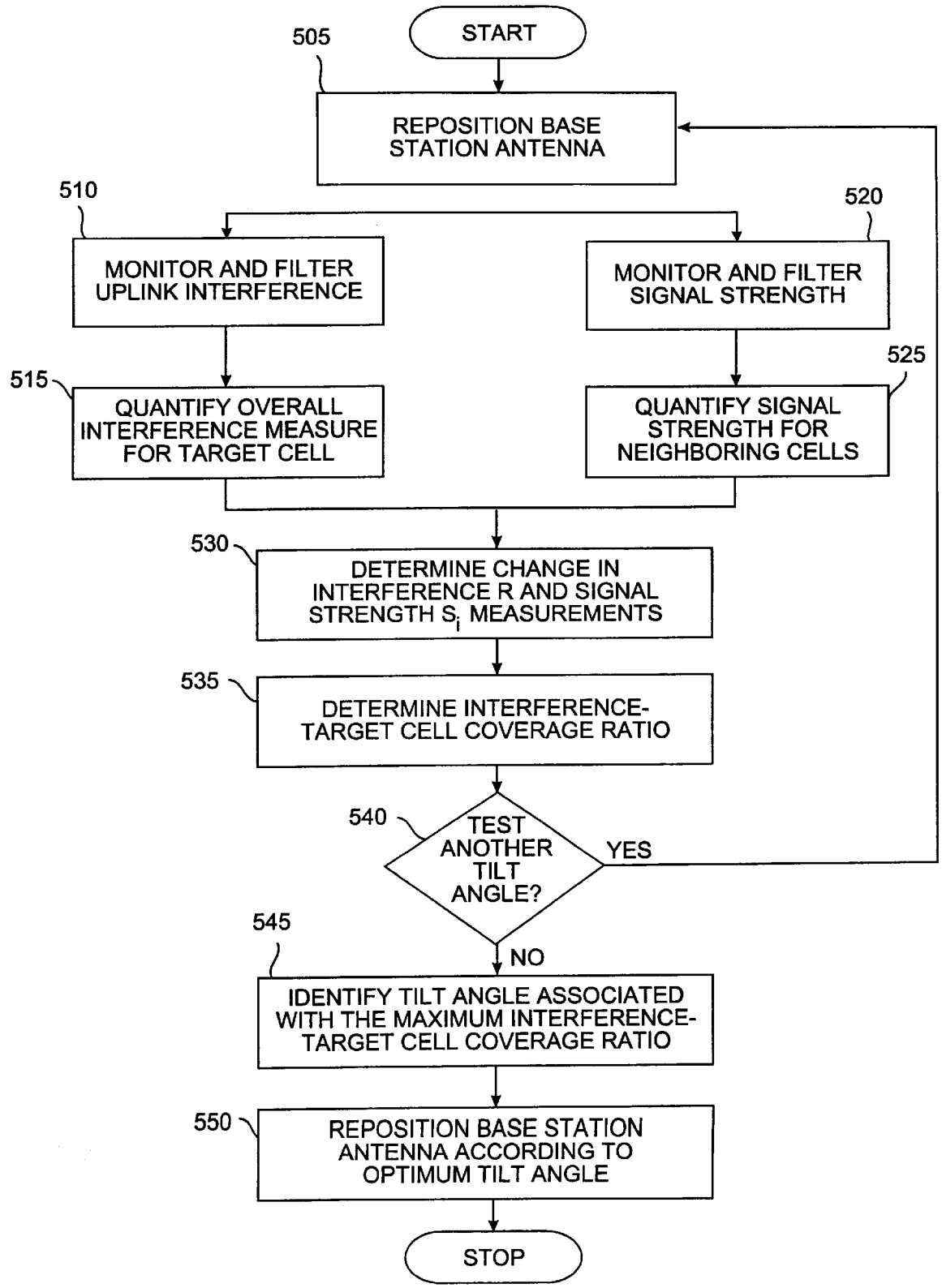

METHOD AND APPARATUS FOR OPTIMIZING ANTENNA TILT

BACKGROUND

The present invention is related to the field of cellular telecommunications. More particularly, the present invention involves adjusting the tilt angle of a base station antenna in a target cell for the purpose of improving the uplink signal quality received by the base station and for improving the signal quality received by mobile units operating in co-channel cells.

In a cellular telecommunications system (e.g., a cellular mobile telecommunications system) maintaining and/or improving speech quality is of great importance. One factor which can significantly and adversely affect speech quality is the presence of co-channel interference. Co-channel interference occurs when two or more cells (i.e., co-channel cells) located adjacent to one another or in relatively close proximity to one another reuse (i.e., share) the same frequency or set of frequencies. In essence, a signal being transmitted over a reused frequency in one cell is perceived as interference in the other cell.

One way in which co-channel interference can be avoided is to assign a group of dedicated frequencies to each cell in the system so that no two cells reuse the same frequency. Unfortunately, there are but a limited number of frequencies available to cover an ever increasing demand for cellular service. Accordingly, assigning a dedicated group of frequencies to each cell is generally not a feasible solution to the co-channel interference problem.

Another technique which is often used to minimize, rather than eliminate, co-channel interference involves maximizing reuse distance. Reuse distance is generally understood to be the distance between two cells (i.e., co-channel cells) that reuse the same frequency or set of frequencies. As one skilled in the art will readily understand, as reuse distance increases, co-channel interference decreases (i.e., signal strength diminishes with distance). However, as the demand for cellular service increases, while the number of available frequencies remains the same, cellular service providers are forced to establish additional cells, which generally have smaller coverage areas. This, in turn, tends to decrease rather than increase reuse distance. Consequently, techniques that rely on increasing reuse distance to counter the effect of co-channel interference are also not an overly practical solution.

Yet another method for reducing co-channel interference involves adjusting the orientation or tilt angle of the base station antenna. In general, the base station antenna transmits and receives telecommunications signals to and from the various mobile units operating within the corresponding cell, herein referred to as the target cell. By repositioning the antenna so that the antenna beam points further and further below the horizon, the energy associated with the antenna beam is, to a greater extent, directed into the target cell and away from any adjacent cells or co-channel cells in close proximity to the target cell. Consequently, uplink interference received by the base station antenna in the target cell is reduced, as is co-channel interference received by mobile units operating in co-channel cells caused by transmissions emanating from the base station antenna in the target cell.

As with the other above-identified techniques for avoiding or minimizing co-channel interference, repositioning the base station antenna to reduce co-channel interference is not without trade-offs. The primary tradeoff associated with repositioning the base station antenna is best illustrated by FIG. 1. In FIG. 1, if the tilt angle 101 is increased, thereby causing the peak of the antenna beam 103 to be directed inward away from the target cell's boundary 105, the signal strength or carrier-to-interference ratio (i.e., C/I) will undesirably decrease for those signals being transmitted between the base station and mobile units operating in the target cell at or near the target cell boundary 105. Stated differently, an increase in the tilt angle 101 of the antenna beam 103 effectively reduces the coverage area of the target cell despite the fact that it also reduces the level of co-channel interference in the target cell as well as in nearby co-channel cells. Accordingly, it is important to determine the antenna tilt angle at which co-channel interference has been sufficiently reduced, while minimizing the loss in coverage area associated with the target cell.

Despite the fact that both interference reduction and target cell coverage area reduction should be taken into consideration when determining an optimum antenna tilt angle, there are no known cellular telecommunication systems which employ such a technique. For example, U.S. Pat. No. 4,249,181 ("Lee") describes a system wherein the level of co-channel interference in a co-channel cell is reduced by tilting the antenna beam downward by a predetermined amount. More specifically, the antenna beam is redirected such that the "notch" in the antenna pattern between the main lobe and the first side lobe is generally pointing in the direction of the neighboring or co-channel cell. While this technique reduces co-channel interference in the target and co-channel cells, there is no guarantee that the signal quality for all mobile units in the target cell as a whole has been improved because in redirecting the antenna beam, the coverage area associated with the target cell may have been substantially reduced, effectively leaving mobile units operating at the boundary of the target cell without service.

In another example, U.S. Pat. No. 5,093,923 ("Leslie") describes adjusting antenna tilt angle to reduce interference. More particularly, Leslie is concerned with adjusting the orientation of an antenna associated with a cellular repeater or booster relative to the donor cell's antenna. However, the orientation of the repeater or booster antenna that is used for transmitting and receiving signals with mobile units does not change. Therefore, the region covered by the repeater and the boundary of the donor cell (i.e., target cell) are unaffected by the orientation of the antenna. Accordingly, Leslie does not take into consideration target cell coverage area in determining the most appropriate antenna tilt angle.

As explained, neither of the two existing designs for reorienting antenna tilt angle, nor any other known designs, take target cell coverage reduction into consideration. Nevertheless, target cell coverage reduction is an important consideration in determining optimal antenna tilt angle. Accordingly, it would highly desirable to provide a technique to reduce co-channel interference by optimizing antenna tilt angle that takes into consideration both co-channel interference reduction as well as target cell coverage area reduction.

SUMMARY

It is an object of the present invention to optimally adjust the orientation of a base station antenna.

It is another object of the present invention to adjust the tilt angle of a base station antenna to reduce co-channel interference.

It is yet another object of the present invention to adjust the tilt angle of a base station antenna to reduce co-channel interference and to minimize any reduction in the coverage area of the target cell.

In accordance with one aspect of the present invention, the foregoing and other objects are achieved by a method and/or an apparatus for optimizing a target cell base station antenna tilt angle. The method and/or apparatus involves determining an interference reduction measure and determining a target cell coverage area reduction measure for each of a plurality of candidate base station antenna tilt angles. The optimum base station antenna tilt angle is then identified, from amongst the plurality of base station antenna tilt angles, as a function of interference reduction and target cell coverage area reduction. The base station antenna can then be repositioned in accordance with the optimum base station antenna tilt angle.

In accordance with another aspect of the present invention, the foregoing and other objects are achieved by a method for reducing co-channel interference by optimizing base station antenna tilt angle in a target cell. The method positions the base station antenna at each of a plurality of candidate antenna tilt angles. During a test interval for each of these candidate antenna tilt angles, uplink interference levels in the target cell are periodically measured, and an overall interference level for each of the candidate base station antenna tilt angles is determined as a function of the periodically measured uplink interference levels. Then, based on the overall interference level of each candidate base station antenna tilt angle and an interference level of a reference antenna tilt angle, an interference reduction measure is established for each tilt angle. The method and/or apparatus also involves determining a target cell coverage area for each of the plurality of candidate base station antenna tilt angles. Then a target cell coverage area reduction measure for each of the plurality of candidate base station antenna tilt angles is established, based on the target cell coverage area of each candidate base station antenna tilt angles. An optimum base station antenna tilt angle is then identified as a function of interference reduction and target cell coverage area reduction, and base station antenna tilt angle is optimized by repositioning the base station antenna in the target cell according to that one candidate base station antenna tilt angle.

BRIEF DESCRIPTION OF THE DRAWINGS

The objects and advantages of the invention will be understood by reading the following detailed description in conjunction with the drawings in which:

FIG. 5 is a flow diagram of a technique for practicing a preferred embodiment of the present invention.

DETAILED DESCRIPTION

Figure 1:
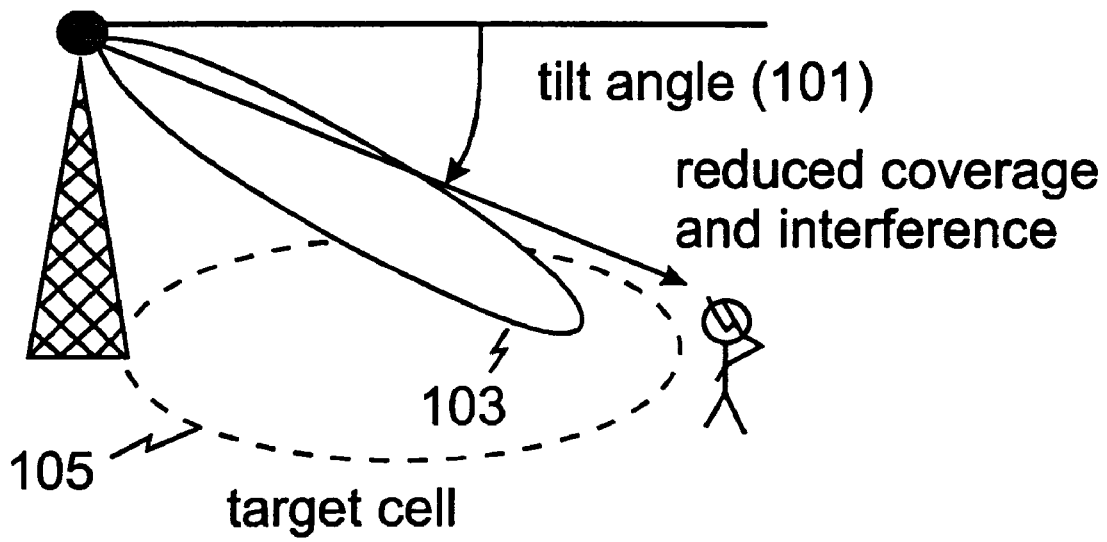
FIG. 1 illustrates the relationship between antenna tilt angle and target cell coverage area in accordance with the prior art.
Figure 2:
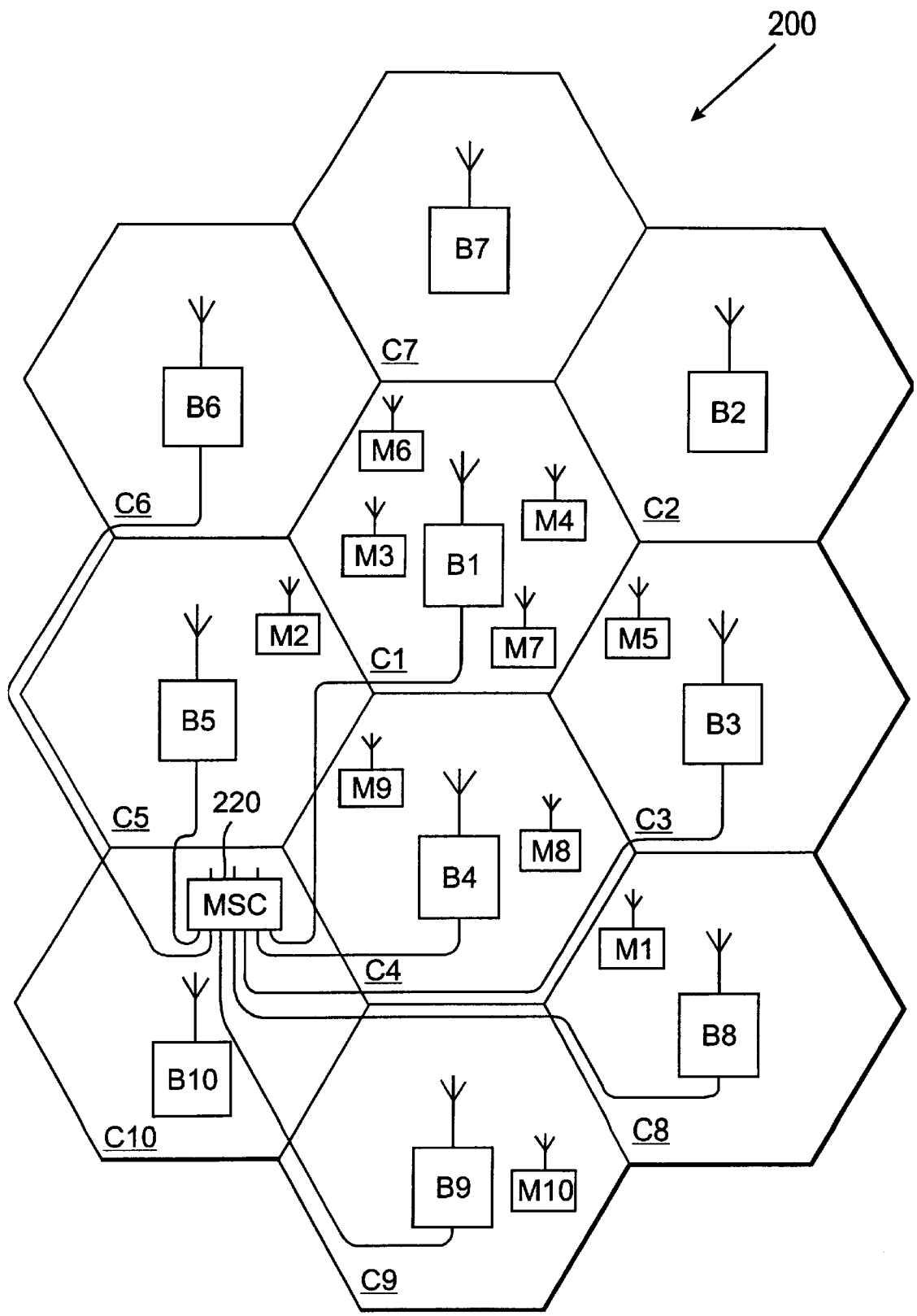
FIG. 2 illustrates a cellular telecommunications network in accordance with the prior art.

FIG. 2 illustrates an exemplary cellular telecommunications network 200 comprising the cells C1–C10. FIG. 2 also illustrates that each cell C1–C10 contains at least one base station, for example, base stations B1–B10. Generally, the base stations communicate directly with the various mobile units M1–M10. In the Advanced Mobile Phone System (AMPS), a mobile switching center (MSC) 220 is usually connected to several base stations, as illustrated. The MSC provides a number of functions including, but not necessarily limited to, frequency allocation and transmitter power level control. In the Groupe Special Mobile (GSM) system employed in Europe, these functions are accomplished by a base station controller (BSC) rather than a MSC, as is well known in the art. It will be understood from the description herein below that the present invention is primarily implemented in software, and in a preferred embodiment of the present invention, that software would be stored in and executed by either the MSC or the BSC.

In a typical frequency allocation plan, two or more cells in the cellular network 200 reuse (i.e., share) the same frequency or set of frequencies. As explained above, reusing frequencies often gives rise to co-channel interference. Unlike prior designs, the present invention addresses the problem of co-channel interference by establishing an optimal base station antenna tilt angle for each base station antenna as a function of both interference reduction and target cell coverage reduction, wherein interference and target cell coverage are measured during a set period of time for each of a number of candidate antenna tilt angles.

In accordance with one aspect of the present invention, interference reduction is quantified by measuring uplink interference for one or more frequency channels at the base station receiver in the target cell. The uplink interference measurements are then transmitted from the base station in the target cell to the MSC/BSC. It will be understood that in a typical cellular system, such as AMPS or GSM, the base station receivers are already configured to measure and then forward uplink interference measurement reports to the MSC/BSC.

As one skilled in the art will readily appreciate, the uplink interference measurements will vary over time. Accordingly, the present invention includes an interference measurement filter. In a preferred embodiment, this filter is implemented in software, and it is stored in and executed by the MSC/BSC. In general, the interference measurement filter generates an overall interference measurement for each of the candidate base station antenna tilt angles based on the uplink interference measurements the MSC/BSC receives from the base station.

Of course, any number of different interference filters are possible. In a first exemplary embodiment, the interference measurement filter may continually average the uplink interference measurements which the MSC/BSC periodically receives from the base station. At the end of the measurement period for each candidate antenna tilt angle, the average interference measurement represents the overall interference measurement for that antenna tilt angle.

In an alternative embodiment, the interference measurement filter in the MSC/BSC may take each uplink interference measurement and derive a 90 percent cumulative probability value for each candidate antenna tilt angle. The 90 percent cumulative probability value is then used as the overall interference measurement for the candidate antenna tilt angle. The 90 percent cumulative probability value is the interference measurement wherein 90 percent of all interference measurements are less than the 90 percent cumulative probability value and 10 percent of all interference measurements are greater than the 90 percent cumulative probability value.

Figure 3A:
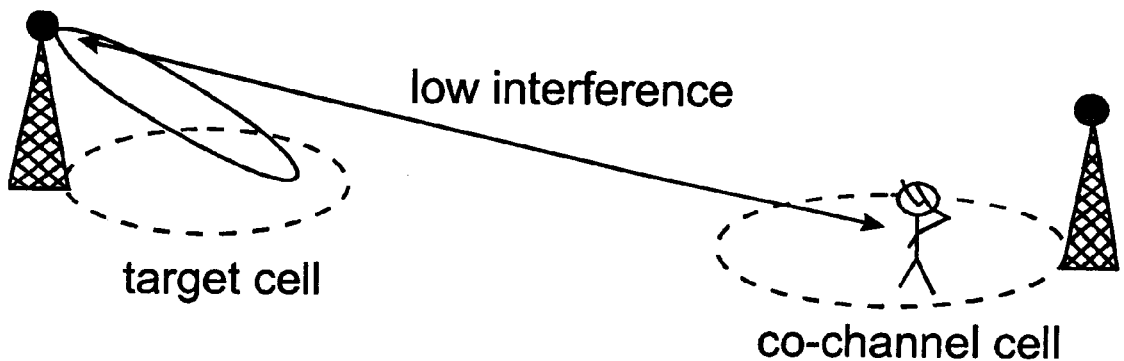
FIGS. 3A and 3B illustrate the relationship between interference level and antenna tilt angle.
Figure 3B:
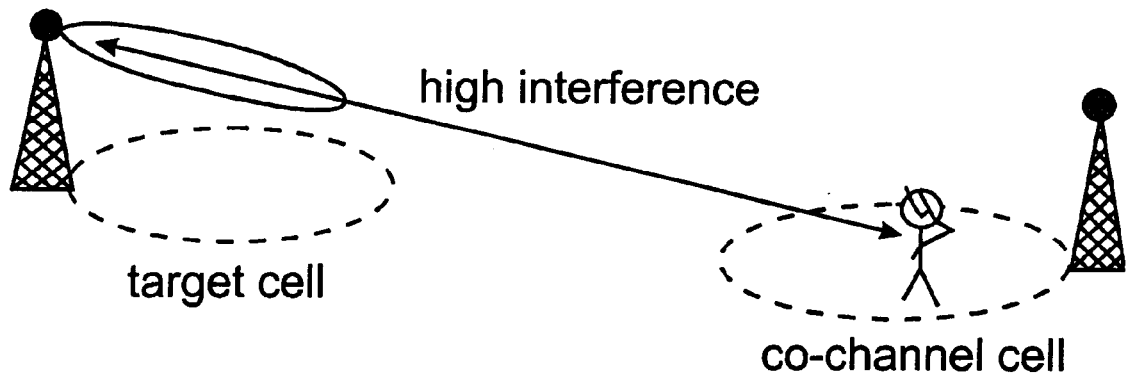

As one skilled in the art will readily appreciate, a relatively large overall interference measurement for a given antenna tilt angle, as illustrated in FIG. 3B for example, may indicate a need to increase the antenna tilt angle. Increasing the antenna tilt angle as illustrated in FIG. 3A, is likely to have the effect of reducing uplink interference at the target cell base station and co-channel interference received by mobile units operating in co-channel cells.

Figure 4A:
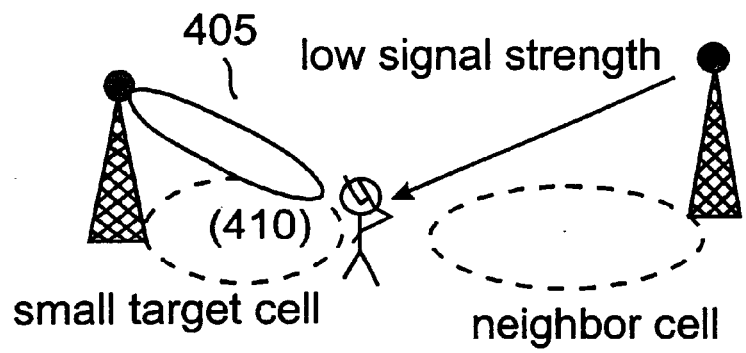
FIGS. 4A and 4B illustrate the relationship between antenna tilt angle, target cell coverage area and the signal strength associated with a neighboring cell.
Figure 4B:
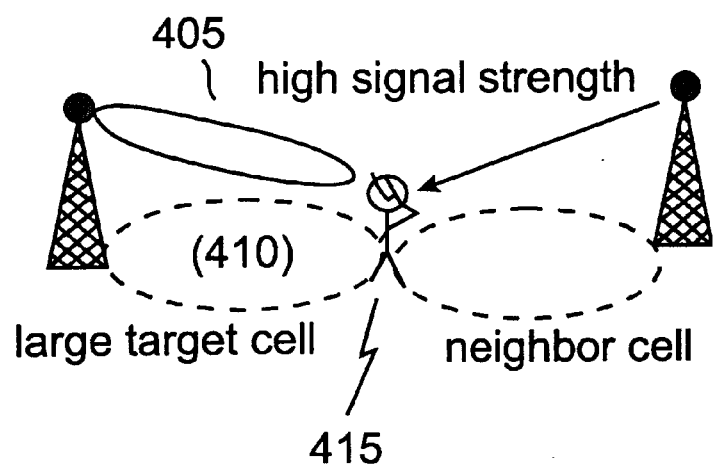

While increasing the antenna tilt angle in the target cell tends to reduce co-channel interference, increasing the tilt angle also reduces the coverage area of the target cell. This is illustrated in FIGS. 4A and 4B. For example, as the peak of the antenna beam 405 is directed further and further inward toward the center of the target cell 410, the signal strength associated with signals between the base station in the target cell and mobile units located at or near the border of the target cell, such as mobile unit 415, will diminish. Consequently, the effective coverage area of the target cell is also diminished. Therefore, in order to truly determine the optimum base station antenna tilt angle, it is imperative to take into consideration both interference reduction and target cell coverage reduction.

In accordance with another aspect of the present invention, target cell coverage area for a given antenna tilt angle may be indirectly measured as a function of the signal strength associated with a neighboring cell as observed by mobile units operating in the target cell. Referring once again to FIGS. 4A and 4B, as the peak of the antenna beam 405 is redirected inward toward the center of the target cell 410, the coverage area associated with the target cell decreases, while the distance between the signal source in the neighboring cell and mobile units operating in the target cell increases on average. Accordingly, the signal strength associated with the neighboring cell decreases, as measured by the mobile units in the target cell. As one skilled in the art will readily appreciate, this decrease in signal strength associated with the neighboring cell as measured by the mobile units in the target cell provides an indirect measure of target cell coverage area reduction.

In a preferred embodiment of the present invention, it is possible to take advantage of the fact that in a typical cellular system, such as AMPS and GSM, mobile units are designed to measure the signal strength associated with the target cell as well as any number of neighboring cells. The signal strength measurements are then transmitted to the target cell base station, which in turn, forwards the signal strength measurements to the MSC/BSC for the purpose of determining whether a mobile assisted handover (MAHO) is warranted. As is well understood in the art, MAHO is a procedure whereby the control over a mobile unit may be passed from the base station in a target cell to the base station in a neighboring cell when the signal strength associated with the neighboring cell exceeds that of the target cell. In most instances, the MAHO procedure is transparent to the subscriber of the mobile unit.

In accordance with an alternative embodiment of the present invention, target cell coverage area reduction may be indirectly measured as a function of the signal strength associated with a neighboring cell, as measured by each mobile unit that undergoes a MAHO from the target cell to the neighboring cell during the measurement period for a given candidate antenna tilt angle. As with the interference measurements, the signal strength measurements taken over the measurement period for a given candidate antenna tilt angle may be averaged to provide a single overall target cell coverage area measurement.

In a second alternative embodiment, traffic load in the target cell and the neighbor cell can be monitored and used to indirectly measure target cell coverage area reduction. For example, if the target cell coverage area is reduced as a result of redirecting the peak of the antenna beam 405 inward toward the center of the target cell 410, as illustrated in FIGS. 4A and 4B, the traffic load in the target cell will naturally decrease while the traffic load in the neighboring cell will naturally increase, as mobile units operating just within the original border of the target cell are likely to be handed-over to the neighboring cell's base station in accordance with the MAHO procedure described above. In contrast, as the effective coverage area of the target cell increases, as a result of redirecting the peak of the antenna beam outward toward the neighboring cell, the traffic load in the target cell will naturally increase while the traffic load in the neighboring cell will decrease. Again, traffic load can be used as an indirect measure of target cell coverage area reduction.

After quantifying both an overall interference level and the target cell coverage area at a given base station antenna tilt angle, the antenna is repositioned at the next candidate antenna tilt angle. As is well known in the art, the antenna can be physically repositioned electrically or electro-mechanically without directly involving additional personnel. This process is repeated until overall interference level and target cell coverage are quantified for each and every candidate antenna tilt angle.

TABLE I

| Angle | Measurement Period | Uplink Interference | Signal Strength of Neighbor A | Signal Strength of Neighbor B |
|---|---|---|---|---|
| 0° | 1 | −93 dBm | −96 dBm | −82 dBm |
| 2° | 2 | −94 dBm | −97 dBm | −84 dBm |
| 4° | 3 | −100 dBm | −97 dBm | −83 dBm |
| 6° | 4 | −101 dBm | −99 dBm | −90 dBm |
| 8° | 5 | −102 dBm | −102 dBm | −92 dBm |

Table I provides exemplary interference and signal strength measures for each of a number of candidate antenna tilt angles, wherein the signal strength measures serve as an indirect measure of target cell coverage area as described above. In accordance with a preferred embodiment of the present invention, the uplink interference measurement and the signal strength measurements corresponding to an antenna tilt angle of 0° are used as reference measurements. The remaining interference and signal strength measurements shown in Table I (i.e., the measurements associated with antenna tilt angles 2°, 4°, 6° and 8°) can then be used to determine the change in interference level (i.e., interference reduction) and the change in target cell coverage area (i.e., target cell coverage area reduction) for each candidate antenna tilt angle. However, it will be understood that interference and signal strength measurements other than those associated with the 0° antenna tilt angle may be used for reference purposes.

TABLE II

| Angle | Interference Change, R | Change in Signal Strength of Neighbor A, $S_A$ | Change in Signal Strength of Neighbor B, $S_B$ |
|---|---|---|---|
| 0° | 0 | 0 | 0 |
| 2° | +1 | 1 | 2 |
| 4° | +7 | 1 | 1 |
| 6° | +8 | 3 | 8 |
| 8° | +9 | 6 | 10 |

Table II contains exemplary values representing the changes in interference R and the changes in signal strength S for each candidate antenna tilt angle based on the interference and signal strength measures depicted in Table I. The present invention can then determine which of the candidate antenna tilt angles is optimal by maximizing an interference reduction-to-target cell coverage area reduction ratio according to the following relationship:

$$R/[1+_{i=1}^{N}\Sigma|S_i|]$$

wherein N represents the number of neighboring cells for which signal strength measurements are taken. In the present example, there are two such neighboring cells A and B (i.e., N=2).

TABLE III

| Angle | The Ratio: $R/(S_A + S_B)$ |
|---|---|
| 0° | — |
| 2° | 0.25 |
| 4° | 2.33 |
| 6° | 0.67 |
| 8° | 0.53 |

Table III presents values representing the interference reduction-to-target cell coverage area reduction ratio for each of the candidate antenna tilt angles, based on the values depicted in Table II. In the present example, the maximum interference reduction-to-target cell coverage reduction ratio of 2.33 corresponds to an antenna tilt angle of 4°. Accordingly, the optimal antenna tilt angle is 4°.

It should be noted that the interference reduction-to-target cell coverage area reduction ratio can be determined for each candidate antenna tilt angle based on changes in traffic load rather than changes in signal strength, as explained above. Furthermore, upon determining the optimal antenna tilt angle, the present invention may cause the MSC/BSC to transmit control signals to the target cell base station, causing the base station to automatically reposition the base station antenna to reflect the optimal antenna tilt angle. As stated above, this may, in turn, be accomplished electrically or electro-mechanically through a servo mechanism.

FIG. 5 is a flow diagram illustrating a technique 500 for establishing an optimum base station antenna tilt angle in accordance with a preferred embodiment of the present invention. As shown in block 505, the base station antenna in the target cell is repositioned to a candidate antenna tilt angle, in response to an antenna control signal generated by the MSC/BSC. Once the antenna is repositioned, the MSC/BSC continuously monitors and filters uplink interference as measured by the base station receiver, as shown in block 510. By filtering the uplink interference measurements, the MSC/BSC ultimately derives an overall interference measure for the target cell with respect to the candidate antenna tilt angle, as shown in block 515. Similarly, the MSC/BSC continuously monitors and filters the signal strength measurements transmitted to the base station by mobile units operating in the target cell or mobile units that undergo MAHO during the measurement period, as shown in block 520. The MSC/BSC eventually establishes an overall signal strength measure for each neighboring cell as shown in block 525. Based on the overall interference measure and the signal strength measures, the MSC/BSC computes the change in interference R and each signal strength measure $S_i$ for each neighboring cell, as shown in block 530. Of course, the change in interference R and the change in signal strength $S_i$ for the reference antenna tilt angle (e.g., an antenna tilt angle of 0°) will be zero. Upon determining the change in interference R and the change in signal strength $S_i$ for each neighboring cell, an interference reduction-to-target cell coverage area reduction ratio is derived, as shown in block 535.

The above-identified technique 500 is then repeated for any number of candidate antenna tilt angles as illustrated by the "YES" path out of decision block 540. After all candidate antenna tilt angles have been tested in accordance with the "NO" path out of decision block 540, the tilt angle associated with the maximum interference reduction-to-target cell coverage area reduction ratio is identified, as shown in block 545; this angle represents the optimum antenna tilt angle. The MSC/BSC can then transmit an antenna position control signal to reposition the base station antenna at the optimum antenna tilt angle, in accordance with block 550. As stated above, the antenna may be electrically or electro-mechanically repositioned.

It will be understood by those skilled in the art that a base station may employ different antennas for receiving signals and transmitting signals. In accordance with another aspect of the present invention, both the receiver antenna and the transmitter antenna are positioned at the same candidate antenna tilt angles during each measurement period.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for optimizing a target cell base station antenna tilt angle comprising the steps of:

determining an interference reduction measure for each of a plurality of candidate base station antenna tilt angles;

determining a target cell coverage area reduction measure for each of said plurality of candidate base station antenna tilt angles;

determining an interference reduction-to-target cell coverage area reduction ratio for each of said candidate base station antenna tilt angles;

identifying an optimum base station antenna tilt angle, from amongst said plurality of base station antenna tilt angles as a function of interference reduction and target cell coverage area reduction; and repositioning the base station antenna in accordance with said one optimum base station antenna tilt angle.

2. The method of claim 1, wherein said step of identifying the optimum base station antenna tilt angle, from amongst said plurality of base station antenna tilt angles, comprises the step of:

determining the one candidate base station antenna tilt angle associated with the maximum interference reduction-to-target cell coverage area reduction ratio.

3. The method of claim 1 further comprising the step of:

measuring signal strength for a signal associated with a neighboring cell for each of said candidate base station antenna tilt angles.

4. The method of claim 3, wherein said step of determining a target cell coverage area reduction measure for each of said plurality of candidate base station antenna tilt angles is a function of the signal strength associated with the neighboring cell as measured by mobile units operating in the target cell.

5. The method of claim 1 further comprising the step of:
   measuring traffic load for each of said candidate base station antenna tilt angles.

6. The method of claim 5, wherein said step of determining a target cell coverage area reduction measure for each of said plurality of candidate base station antenna tilt angles is a function of traffic load in the target cell and traffic load in the neighboring cell.

7. The method of claim 1, wherein said step of determining an interference reduction measure for each of the plurality of candidate base station antenna tilt angles comprises the step of:
   measuring uplink interference at the target cell base station for each of the plurality of candidate base station antenna tilt angles.

8. In a cellular telecommunications network, a method for reducing co-channel interference by optimizing base station antenna tilt angle in a target cell, said method comprising the steps of:
   positioning the base station antenna at each of a plurality of candidate antenna tilt angles;
   periodically measuring uplink interference levels in the target cell during a test interval for each of said candidate base station antenna tilt angles;
   determining an overall interference level for each of said candidate base station antenna tilt angles as a function of the periodically measured uplink interference levels;
   establish an interference reduction measure for each of said plurality of candidate base station antenna tilt angles, based on the overall interference levels for each of said candidate base station antenna tilt angles and an overall interference level of a reference antenna tilt angle;
   determining target cell coverage area for each of said plurality of candidate base station antenna tilt angles;
   establishing a target cell coverage area reduction measure for each of said plurality of candidate base station antenna tilt angles, based on the target cell coverage area of each candidate base station antenna tilt angles;
   determining an interference reduction to target cell coverage area reduction ratio for each of the candidate base station antenna tilt angles;
   identifying the one candidate base station antenna tilt angle as a function of interference reduction and target cell coverage area reduction; and
   repositioning the base station antenna in the target cell according to the one candidate base station antenna tilt angle.

9. The method of claim 8, wherein said step of repositioning the base station antenna comprises the step of:
   electrically repositioning the base station antenna.

10. The method of claim 8, wherein said step of repositioning the base station antenna comprises the step of:
   electro-mechanically repositioning the base station antenna.

11. The method of claim 8, wherein said step of determining the overall interference level for each of said candidate base station antenna tilt angles comprises the step of:
   filtering the periodically measured uplink interference levels for each of said candidate base station antenna tilt angles.

12. The method of claim 11, wherein said step of filtering the periodically measured uplink interference levels comprises the step of:
   averaging the periodically measured uplink interference levels for each candidate base station antenna tilt angle.

13. The method of claim 11, wherein said step of filtering the periodically measured uplink interference levels comprises the step of:
   determining a 90 percent cumulative probability measure for each candidate base station antenna tilt angle.

14. The method of claim 8, wherein said step of determining target cell coverage area for each of said plurality of candidate base station antenna tilt angles comprises the step of:
   measuring signal strength for a signal associated with a neighboring cell for each of said candidate base station antenna tilt angles as measured by mobile units operating in the target cell, and wherein the target cell coverage area for a given candidate base station antenna tilt angle is a function of the signal strength associated with the neighboring cell.

15. The method of claim 8, wherein said step of determining target cell coverage area for each of said plurality of candidate base station antenna tilt angles comprises the step of:
   measuring traffic load in the target cell and the neighboring cell for each of said candidate base station antenna tilt angles, wherein target cell coverage area is determined as a function of the traffic load in the target cell and the traffic load in the neighboring cell.

16. The method of claim 8, wherein said step of identifying the one candidate base station antenna tilt angle comprises the step of:
   identifying the candidate base station antenna tilt angle corresponding to a maximum interference reduction to target cell coverage area reduction ratio.

17. An apparatus for optimizing a target cell base station antenna tilt angle comprising:
   means for determining an interference reduction measure for each of a plurality of candidate base station antenna tilt angles;
   means for determining a target cell coverage area reduction measure for each of said plurality of candidate base station antenna tilt angles;
   means for determining an interference reduction to target cell coverage area reduction ratio for each of said candidate base station antenna tilt angle;
   means for identifying an optimum base station antenna tilt angle, from amongst said plurality of base station antenna tilt angles, as a function of interference reduction and target cell coverage area reduction; and
   control means for repositioning the base station antenna in accordance with said one candidate antenna tilt angle.

18. The apparatus of claim 17, wherein said means for identifying the optimum base station antenna tilt angle, from amongst said plurality of base station antenna tilt angles comprises:
   means for determining the one candidate base station antenna tilt angle associated with the maximum interference reduction to target cell coverage area reduction ratio.

19. The apparatus of claim 17 further comprising:
   means for measuring signal strength for a signal associated with a neighboring cell for each of said candidate base station antenna tilt angles.

20. The apparatus of claim 19, wherein said means for determining a target cell coverage area reduction measure for each of said plurality of candidate base station antenna tilt angles comprises:
   means for determining target cell coverage area as a function of the signal strength associated with the neighboring cell.

21. The apparatus of claim 17 further comprising:

means for measuring traffic load in the target cell and the neighboring cell for each of said candidate base station antenna tilt angles.

22. The apparatus of claim 21, wherein said means for determining the target cell coverage area reduction measure for each of said plurality of candidate base station antenna tilt angles is a function of traffic load.

23. The apparatus of claim 17, wherein said means for determining an interference reduction measure for each of the plurality of candidate base station antenna tilt angles comprises:

means for measuring uplink interference at the target cell base station for each of the plurality of candidate base station antenna tilt angles.

* * * * *